United States Patent
Gruber et al.

(10) Patent No.: US 11,041,798 B2
(45) Date of Patent: Jun. 22, 2021

(54) ARRANGEMENT FOR DETERMINING THE ACHIEVABLE ADHESIVE STRENGTH BEFORE FORMING A CONNECTION HAVING MATERIAL CONTINUITY TO A SURFACE OF A JOINING PARTNER

(71) Applicant: FRAUNHOFER-GESELLSCHAFT ZUR FOERDERUNG DER ANGEWANDTEN FORSCHUNG E.V., Munich (DE)

(72) Inventors: Florian Gruber, Dresden (DE); Wulf Graehlert, Dresden (DE); Philipp Wollmann, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 15/758,063

(22) PCT Filed: Aug. 31, 2016

(86) PCT No.: PCT/EP2016/070469
§ 371 (c)(1),
(2) Date: Mar. 7, 2018

(87) PCT Pub. No.: WO2017/042064
PCT Pub. Date: Mar. 16, 2017

(65) Prior Publication Data
US 2018/0180528 A1    Jun. 28, 2018

(30) Foreign Application Priority Data
Sep. 7, 2015  (DE) ..................... 10 2015 217 091.8

(51) Int. Cl.
| | |
|---|---|
| *G01N 19/04* | (2006.01) |
| *G01N 21/55* | (2014.01) |
| *G01N 21/59* | (2006.01) |
| *G01N 21/21* | (2006.01) |
| *G01N 21/17* | (2006.01) |

(52) U.S. Cl.
CPC ............ *G01N 19/04* (2013.01); *G01N 21/21* (2013.01); *G01N 21/55* (2013.01); *G01N 21/59* (2013.01); *G01N 2021/1765* (2013.01)

(58) Field of Classification Search
None
See application file for complete search history.

(56) References Cited

U.S. PATENT DOCUMENTS 5,406,082 A * 4/1995 Pearson ............. G01B 11/0625
250/301
5,543,924 A * 8/1996 Surowiec ........... G01N 21/4738
356/446

(Continued)

FOREIGN PATENT DOCUMENTS

| EP | 2138830 A2 | 12/2009 |
| JP | 2009244003 A | 10/2009 |

(Continued)

OTHER PUBLICATIONS

Gao L, Smith RT. Optical hyperspectral imaging in microscopy and spectroscopy—a review of data acquisition. J Biophotonics. 2015;8(6):441-456. doi:10.1002/jbio.201400051.*

(Continued)

*Primary Examiner* — Rebecca C Bryant
(74) *Attorney, Agent, or Firm* — Jacobson Holman PLLC

(57) ABSTRACT

In the arrangement for determining the achievable adhesive strength before forming a connection having material continuity to a surface of a joining partner, a plurality of detectors are present and arranged that are configured for a (Continued)

Figure 1:
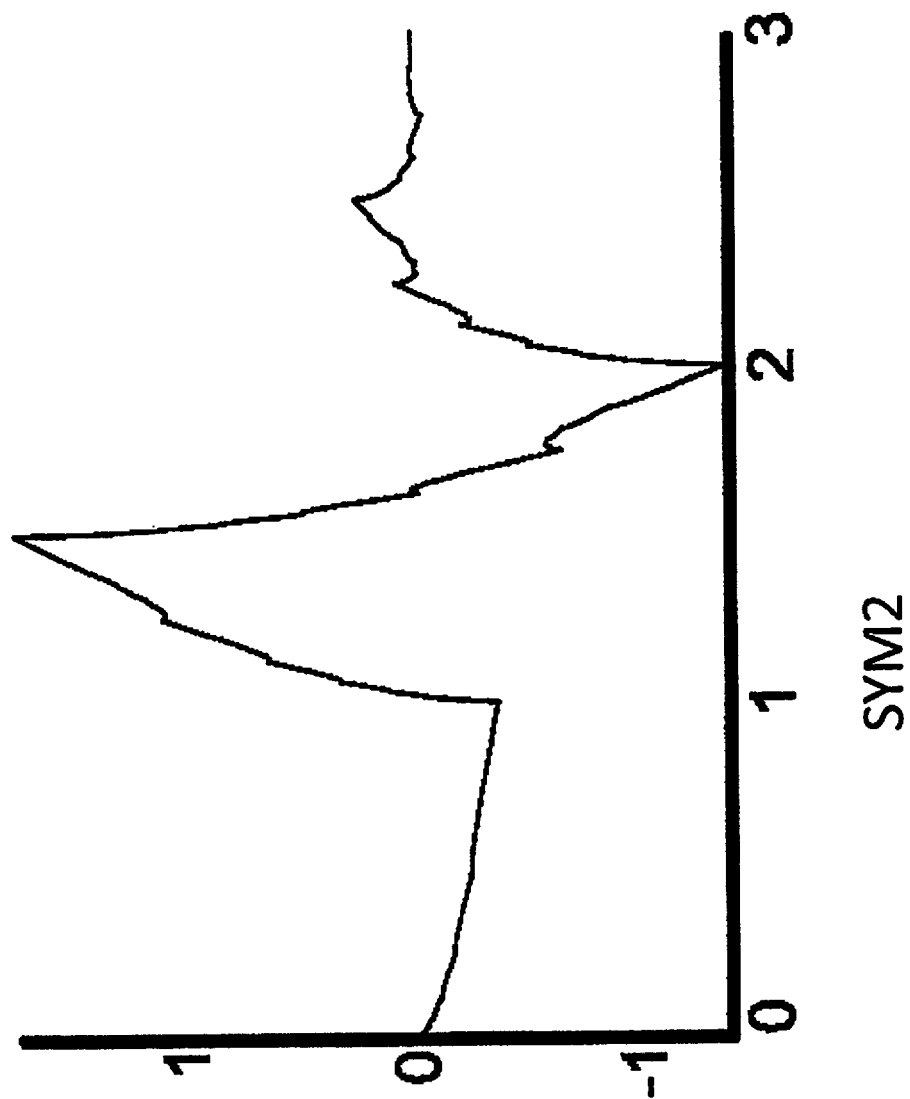

spatially resolved spectral analysis of electromagnetic radiation within a wavelength interval and are connected to an electronic evaluation unit. They can detect radiation emitted from a broadband radiation source of a reflection incident on the surface of one of the joining partners, and/or after passing through joining partners transparent for the electromagnetic radiation on the detectors. A laterally and temporally homogeneous intensity of the electromagnetic radiation should be observed in this respect. The joining partner is formed from a material that does not 100% absorb the respective electromagnetic radiation and thus a transmission and/or reflection is possible. The electronic evaluation unit is configured such that the measured signals of the detectors detected with spatial resolution and wavelength resolution can be detected within a wavelength interval for individual local points that are arranged on a predefinable surface and measured signals detected at a plurality of positions can be associated with a respective part region of the detected surface (hypercube). A data reduction can be carried out for all measurement signals of the part regions. A statement on a corresponding adhesive strength is achievable using these selected features with a regression model stored in the memory.

10 Claims, 3 Drawing Sheets

(56) References Cited

U.S. PATENT DOCUMENTS

| | | | |
|---|---|---|---|
| 7,301,649 B2 | 11/2007 | Fabrikant et al. | |
| 8,345,234 B2* | 1/2013 | Myrick | G01J 3/02 356/300 |
| 9,052,294 B2 | 6/2015 | Walton | |
| 10,228,329 B2 | 3/2019 | Grachlert et al. | |
| 2001/0052979 A1 | 12/2001 | Treado et al. | |
| 2004/0073398 A1 | 4/2004 | Nikoonahad et al. | |
| 2004/0149026 A1 | 8/2004 | Potyrailo et al. | |
| 2007/0019194 A1 | 1/2007 | Chen et al. | |
| 2008/0245979 A1 | 10/2008 | Banton et al. | |
| 2010/0108873 A1 | 5/2010 | Schwertner | |
| 2012/0304756 A1* | 12/2012 | White | G01N 21/3586 73/150 A |
| 2015/0131090 A1 | 5/2015 | Osumi | |
| 2017/0067819 A1* | 3/2017 | Yost | G01N 23/2273 |

FOREIGN PATENT DOCUMENTS

| | | |
|---|---|---|
| WO | WO-2004/042373 A1 | 5/2004 |
| WO | WO-2011/047016 A1 | 4/2011 |
| WO | 2013/157641 | 10/2013 |

OTHER PUBLICATIONS

"Measurement of Adhesion in Extrusion Coatings Using On-Line Techniques", 2244 Research Disclosure, Mason Publications, No. 301, May 1, 1989, p. 372.

P. Wollmann, "Spektroskopie in nueuen Dimensionen; Hyperspectral Imaging in Labor und Prozessanwendungen", Optische Systeme, #14621870482645568926.

P. Wollmann et al., "Hyperspektrales Imaging für die Schichtanalytik", Schwerpunkt, #14621870482645568926.

P. Wollmann et al., imanto® imaging tools, Lighting, Software, Tools; "Non-destructive screening, 100% inspection and characterization by hyperspectral imaging", #14621870482.

* cited by examiner

ARRANGEMENT FOR DETERMINING THE ACHIEVABLE ADHESIVE STRENGTH BEFORE FORMING A CONNECTION HAVING MATERIAL CONTINUITY TO A SURFACE OF A JOINING PARTNER

The invention relates to an arrangement for determining the achievable adhesive strength before forming a connection having material continuity to a surface of a joining partner. Joining partners can here be connected to one another by adhesive bonding, welding, or soldering. In this respect, joining partners can equally be connected to one another that are both formed from the same material, in particular plastics, metals, or ceramics, or of which at least one joining partner is formed from a polymer. Joining partners of different materials can thus also be examined before the connection having material continuity is established. The achievable adhesive strength of a coating that is applied to the surface of a component that will likewise be called a joining partner in the following can, however, also be determined before the coating is formed.

In this respect, adhesive strength can be understood as the achievable adhesion effect.

It has previously been customary preferably to test such adhesive strengths by means of a wedge test in accordance with DIN 65448, but also by means of pull-off test in accordance with ISO 4624, a T-peel test in accordance with DIN 53282, tensile strength in accordance with DIN 53288, a roller peel test in accordance with DIN 53289 and further test methods. Corresponding samples can thus, however, only be tested after the formation of the connection having material continuity and its hardening, which can just like the actual test take a plurality of days. A test directly during production is thereby not possible. In addition, they are methods in which the samples have to be destroyed.

The adhesive strength of coatings is typically determined by means of a tape test. This can only be carried out after the formation of the coating. A prediction is therefore not possible. In addition, the coating is destroyed and the respective substrate is at least impaired.

It is therefore an object of the invention to provide possibilities for the nondestructive determination of the achievable adhesive strength prior to the formation of a connection having material continuity to a surface of a joining partner that produce in a considerably shortened time results having sufficient precision and thus can even be used for an inline measurement in production processes.

This object is achieved in accordance with the invention by an arrangement having the features described below. Advantageous embodiments and further developments of the invention can be realized using features designated below.

The arrangement in accordance with the invention for determining the achievable adhesive strength before forming a connection having material continuity to the surface of a joining partner has a plurality of detectors that are configured for a spatially resolved spectral analysis of electromagnetic radiation within a wavelength interval. These detectors are arranged for this purpose in a row arrangement or in a row and column arrangement. The detectors are connected to an electronic evaluation unit and are arranged such that electromagnetic radiation emitted by a broadband radiation source impacts the detectors either after a reflection at the surface of one of the joining partners, a layer formed on the surface of a joining partner with which the connection having material continuity is formed and/or after the irradiation of joining partners transparent for the electromagnetic radiation. The irradiation takes place here such that a homogeneous intensity of the electromagnetic radiation is observed on a surface from which the electromagnetic radiation is reflected or which is transmitted by the surface. The respective surface to be detected simultaneously should therefore be irradiated at a homogeneous intensity. In the broadband irradiation, electromagnetic waves that lie within a wavelength interval are directed to the respective surface of one of the joining partners that is to be investigated.

The joining partners or a coating that is formed on the surface and on whose surface the electromagnetic radiation is directed is formed from a material that does not absorb the respective electromagnetic radiation 100% and so an at least 2% transmission and/or reflection of the electromagnetic radiation is possible.

The electronic evaluation unit is configured such that the measured signals detected by the detectors with spatial and wavelength resolution within a wavelength interval can be associated with a specific wavelength range and with an individual local point within a predefinable part region of the irradiated surface.

The detection and evaluation can here take place over the total surface of the surface of the joining partner or of all the joining partners used for the joining having material continuity. There is, however, also the possibility of carrying out a determination at one or more part surfaces.

The totality of the intensities detected with wavelength resolution at all the local points of the respective irradiated surface forms a three-dimensional data structure comprising one dimension with wavelength resolution and two dimensions with spatial resolution (hypercube).

A data reduction for all the measured signals of the part region detected with wavelength resolution should then be able to be carried out in which significant features are selected and the feature set resulting therefrom is subjected to a regression process using a regression model that is stored in an electronic memory and that was determined using feature sets that were determined at samples whose adhesive strengths were determined using a different measurement process that preferably has higher measurement accuracy, whereby a statement can be derived on the adhesive strength of the respective part region of the joining connection, with at least one part region being used to evaluate the adhesive strength.

A connection having material continuity of joining partners examined using the invention should belong to the same class that should have a comparable setup or composition as have been examined in advance using a different measurement method.

The functional relationship between appropriately selected feature sets of joining partners connected to one another with material continuity and their adhesive strengths that were determined using a different measurement process can be determined, for example, by means of linear or non-linear regression, by means of a partial least square (PLS) algorithm, by means of a neuronal network, by means of a combination of at least two of these methods or of other regression methods (regression model).

The regression model that was prepared using data records of samples detected by the arrangement in accordance with the invention that were subjected to the data reduction and the feature extraction and whose adhesive strengths—determined using a different measurement process—should be included in the electronic memory. The adhesive strength of a comparatively investigated sample of the same sample class having a comparable structure can be determined from the data sets determined using the arrangement in accordance with the invention using a regression model stored in the electronic memory.

The electronic evaluation unit carries out the data reduction and feature extraction of the data sets determined using the arrangement in accordance with the invention. An evaluation of the spectral information and subsequently of the spatial information can take place first here. An order reversed with respect thereto or any desired combination of more than two individual steps for data reduction and feature extraction is also possible.

The data reduction and feature extraction can take place by means of principal component analysis (PCA), parameterization of texture information, averaging, and/or determination of the standard deviation and combinations thereof.

In the case of the use of principal component analysis, the n intensities of the wavelengths (spectra) of all the local points are transformed by coordinate transformation into a new orthogonal coordinate system—the principal component space—in which the original data have maximum variance, and with n representing the number of measured wavelengths.

The coordinate transformation is calculated by the determination of the n eigenvectors (principal components) and of the associated n eigenvalues of the covariance matrix of the data set of the measured part surface. The greater the nth eigenvalue, the more the corresponding nth principal component describes the original variance, i.e. the eigenvector having the greatest eigenvalue is the 1st principal component of the data set and describes the greater part of the original variance of the data set. The eigenvector having the lowest eigenvalue is the nth principal component of the data set and does not describe any relevant properties of the data set. Only a specific number of principal components are taken into account—frequently the first three to six that already ensure a sufficient description—for example >95% of the original variance of the data set. The number of principal components to be taken into account—and thus the dimensionality of the principal component space—can be selected with criteria assistance, for example with reference to the proportion in the total variance or with reference to a scree test.

The coordinates of the spectra in the newly spanned principal component space are the so-called score values that sufficiently characterize the corresponding local point.

The data reduction and feature extraction can advantageously take place using the electronic evaluation unit such that the data detected in accordance with the invention are evaluated in the same manner as the data of the samples with reference to whose known adhesive strengths the regression model was prepared. The adhesive strength of the sample is subsequently determined using the data set detected in accordance with the invention, the intensities of the electromagnetic radiation detected with spatial and wavelength resolution.

The following procedure can preferably be used in the evaluation of the data detected in accordance with the invention:

Variant a) The first six principal components, including the score values, are preferably determined by a principal component analysis of the spectral information of all the local points of the part surface. Since the data detected in accordance with the invention represent all the local points of an investigated surface, the areal distribution of the score values per principal component can be specified. The quantification of the different areal distribution of the score values takes place here by different statistical parameters that are determined using all the score values of a principal component of the respective part surface. They are in particular the variance, the interquartile range, or the mean absolute deviation. This procedure can be used for all principal components. The determination of the adhesive strength takes place by the electronic evaluation unit on the basis of a regression model such as a partial least square (PLS) regression model, where the parameters are optionally subjected to a further prior feature extraction, preferably via a further principal component analysis (PCA).

The regression model used here (PLS here) was determined beforehand using samples of the same sample class having a comparable structure whose adhesive strengths were determined using a different measurement method, where all the steps of the feature extraction were carried out analogously to the above-described process.

Variant b) One or more principal components, in particular the score values of the local points per principal component, that can be specified distributed areally over the sample are calculated via a principal component analysis of the spectral information of all the detected local points of the respective investigated part surface. The local points can here be described by different parameters of the score values and can be reproduced as a figurative representation. In addition to the actual score value, this can in particular also be achieved by the parameters that result from a texture analysis of the spatially resolved distribution of the score values. A discrete wavelet transformation (DWT) is preferably used for this purpose, with the "Sym2" wavelet being used, for example, for carrying out the calculations and with a subsequent calculation of further parameters being carried out, e.g. the energy signature (sum of squares) of the wavelet parameters. The calculated parameters that are determined at the examined surface of the joining partner can be determined using a regression model, in particular a linear regression model, for the further feature extraction and thus for determining the feature "adhesive strength" of the part surface. The regression model used here was determined beforehand using samples of the same sample class having a comparable structure and properties whose adhesive strengths were determined using a different measurement method, where all the steps of the feature extraction were carried out analogously to the above-described process.

In the case of a use of discrete wavelet transformation, the texture of at least one image detected by the detectors, in particular recurring structures (frequencies), can be described. The wavelet transformation (WT) corresponds to a digital filtering by high pass and low pass frequencies, with the filter function (wavelet) being able to be selected as variable and with the frequency response being direction-dependent. The carrying out of the WT at images or figurative representations in vertical, horizontal, and diagonal directions thus produces different results. A calculation of all three directions can take place separately. The result is determined by the low pass information (wavelet coefficient) and the remaining information is discarded; each picture element here represents a wavelet coefficient and all the picture elements together represent the wavelet matrix. In addition, the spatial resolution is reduced and information is separated on the carrying out of the WT. The separation of the information means that m*0.5 picture elements are still obtained for a number of originally m picture elements after the WT. The WT can be carried out recursively multiple times. This can take place in three stages to obtain information on the fine structure, medium-fine structure, and rough structure of the images. More than or fewer than three stages are, however, also possible. Further parameters can be determined from the wavelet coefficient of each WT for describing structures of the wavelet matrix or its figurative imaging; the root of the sum of squares of the coefficients of the wavelet matrix (energy), entropy, and the gray scale matrix and parameters derived therefrom are frequently used in this respect.

An examined part region should have a size in the range 500 µm×500 µm up to 1500 µm×1500 µm. A detection should be able to be performed at a spatial resolution in the range 0.5 µm to 1.5 µm, preferably at 1 µm.

At least 30 detectors, preferably at least 100 detectors, should be arranged in a row here (hyperspectral camera).

At least one detector, preferably at least 50 detectors, should be arranged in a column here.

A hyperspectral camera having suitable beam-shaping optical elements and electronic evaluation electronics can be used for an arrangement in accordance with the invention.

The irradiation of the surface should take place at at least an angle in the range 0° to <90° with respect to the normal of the surface on which the electromagnetic radiation is incident. On an irradiation through at least one joining partner transparent for the electromagnetic radiation, the angle should advantageously be observed of at least almost 0° to the sample normal, that is the radiation should be directed onto this surface in as perpendicular a manner as possible to keep the reflected portion as small as possible. The irradiation and detection can also be carried out at a variable angle of incidence of the electromagnetic radiation. As already expressed, angles of incidence can be selected in the range of 0° to a maximum of 89° here.

The detection can also be limited to linearly polarized electromagnetic radiation. In this case, an advantageous alignment of one or more polarization planes before and/or after the irradiation surface can be selected.

The detectors and the respective joining partners still not connected to one another with material continuity can in particular be moved along at least one axis relative to one another and in this respect preferably at an advantageous spacing from one another on a use of detectors that can only measure a line in a simultaneously spectrally and spatially resolved manner. With statically fixed detectors and a statically fixed radiation source, a sample formed with a joining partner not yet connected with material continuity can thus be moved along an axis. This can be achieved with a correspondingly movable table on which such a sample is arranged that can be moved in an x direction and optionally also in a y direction. An unwinding from roll to roll is, however, also possible when the respective sample is formed with one or more flexibly deformable materials and is present, for example, in the form of a film in this respect.

Elements shaping the electromagnetic radiation can be present at the radiation source. In a simple embodiment, the radiation source can be combined with a microscope. A radiation source can, however, also be arranged in a hollow body from which the electromagnetic radiation exits diffusely and can be directed to the surface to be irradiated. The hollow body can be a sphere or a cylinder. A surface to be detected simultaneously should be able to be homogeneously irradiated. With a radiation source with beam-shaping optical elements, the utilized wavelength range should be taken into account in the selection of the respectively used optical elements serving the beam shaping.

The size of the part surface to be examined and the required spatial resolution can be influenced by the use of elements arranged upstream of the detectors and shaping the electromagnetic radiation. In a simple embodiment, the camera or detector arrangement can be used combined with a microscope or with a telecentric lens.

A diaphragm that avoids the incidence of scattered electromagnetic radiation can preferably be arranged in front of the detectors in the optical beam path of the electromagnetic radiation.

Electromagnetic radiation whose wavelength range starts in the UV spectrum and ends in the IR spectrum can be emitted from the radiation source. Radiation from the wavelength range of visible light up to and into the NIR spectrum, that is, from 250 nm to 1000 nm, is particularly preferred. Where possible, all the wavelengths within the respective interval should be able to be used in a utilized wavelength range. The limits should be predefined solely by the sensitivity range of the detectors used with respect to their sensitivity/measurement accuracy of the intensities detectable with them for the respective wavelengths and with respect to the optical properties of the beam guiding components. Those spectral ranges should preferably be used that have the greatest variance between the spectra of the samples for determining the adhesive strength and that have a determination error that is as small as possible.

At least one element with which a direct choice of the polarization of the electromagnetic radiation can be achieved can also be present in the optical path or can be integrated therein.

A sample of joining partners that can be connected to one another with material continuity can also be a multilayer design, a plurality of layers preferably formed from different materials or substances. The base material of the sample can be a polymer film or a thin metal film or glass film onto which further thin films of polymer, ceramics or metal can be applied in different combinations. A determination of the achievable adhesive strength can also take place for more than two joining partners to be connected with material continuity. They can be arranged above one another in this respect, for example in the form of a stack. As already addressed, joining partners can be connected with material continuity by adhesive bonding. In this respect, a suitable bonding agent is present between the surfaces of the joining partners connected with material continuity. The connection having material continuity can also have been formed by welding, with and without additional material. The achievable adhesive strength can also be determined for a solder connection. A determination of the adhesive strength to be expected of coatings such as color layers, plastic layers on metal or ceramic surfaces, coating that are formed by means of CVD or PVD processes can, however, also take place.

The detectors used and the electronic evaluation unit as well as optionally also the radiation source can represent a so-called hyperspectral imaging system that can be used in the arrangement in accordance with the invention. Textural information for the respective detected part region of the sample can thereby also be obtained in addition to the spectral information.

A reduction of the data that were determined on the detection of intensities determined at the individual local points for the individual wavelengths of a detected wavelength range (spectrum) can be advantageous in the actual evaluation. Information relevant to the determination of the adhesive strength can thereby be separated from the non-relevant information, whereby the electronic processing effort is also substantially reduced and the required time is likewise reduced. The use of a highly complex, cost-intensive electronic processing technique is not required.

A statistical model can be prepared with the invention on the basis of which the achievable adhesive strength of the examined surfaces of one and/or both joining partners in a correspondingly underlying part region can be predicted. For this purpose, the data set can be detected with one of a plurality of optical detectors which are preferably arranged in a row and with which a detection of intensities is possible with wavelength resolution and spatial resolution.

The achievable adhesive strength is influenced by the properties of the examined surfaces of the sample. These properties can be particles, adsorbates, layer thicknesses, materials, surface roughness, surface topology, etc. and their distribution over the respective examined part surface. These sample-specific properties equally have the effect that electromagnetic radiation that interacts with the sample is differently (spectrally, intensity) reflected, scattered, or transmitted. The totality of a sufficient number of individual intensities (spectra) of different local points of a detected part surface of a sample detected with wavelength resolution can thus represent the information on the adhesive strength to be expected of a joining partner in the sample range under observation.

The adhesive strength can be determined for the determination of the adhesive strengths with reference to a measured feature set using a regression model set up with feature sets measured beforehand at samples of the same sample class having a comparable structure.

The measured feature sets are subjected to a data reduction and thus to a feature extraction for this purpose. The wavelength spectra detected at the individual local points of the respective part surface can thus be subjected to a spectral feature extraction, for example to a cluster analysis or a principal component analysis. The parameters used in the regression model can accordingly be the number and distribution of the clusters, the score values of the principal components, or their distribution.

Furthermore, methods of image compression can be used for a texture evaluation for the feature extraction, in which texture evaluation the intensities of individual wavelengths detected at all local points of the respective part surface or those of the sum or of the averaged sum of the intensities of a plurality of wavelengths, or the parameters determined by a spectral feature reduction and/or the combinations are subjected to an image compression. To describe the texture information of the data set, at least one parameter should be determined in this respect via a wavelet transformation or on another image compression method such as Taylor polynomials, Fourier and cosine transformations, discrete cosine transformation, or gray scale matrix method.

The adhesive strength of part surfaces can be predicted on the basis of a calibration model (regression model) that was prepared using measured data sets of samples of the same sample class having a comparable structure and a known adhesive strength, with the respective measured data sets being treated for the calibration and prediction using identical steps of the feature reduction. A "multiple linear regression analysis" (MLRA), a "principal component regression" (PCR), a "partial least square regression" (PLS), or a "neuronal network" can be used by way of example here.

The requirements for a sufficient determination accuracy are a homogeneous illumination of the surface used for the detection so that a superposition of the intensity fluctuations caused by the sample with lateral fluctuations of the illumination intensity can be avoided by implementations of a laterally homogeneous light field. A microscope optics can advantageously be used for small sample regions. The arrangement in accordance with the invention can be adapted to the respective surface of the sample to be detected by use of different optics, working distances, and enlargements.

A determination of achievable adhesive strengths of samples can be carried out using the invention within a few milliseconds to minutes instead of days. A contactless non-destructive measurement is possible. The samples do not have to be additionally treated or otherwise prepared. A use in quality control and in inline monitoring of production is preferred so that no sample removal and no separate determination are required in these cases.

The invention will be explained in more detail by way of example in the following.

There is shown:

FIG. 1 a wavelet transformation using the "Sym2" wavelet; and

Figure 2:
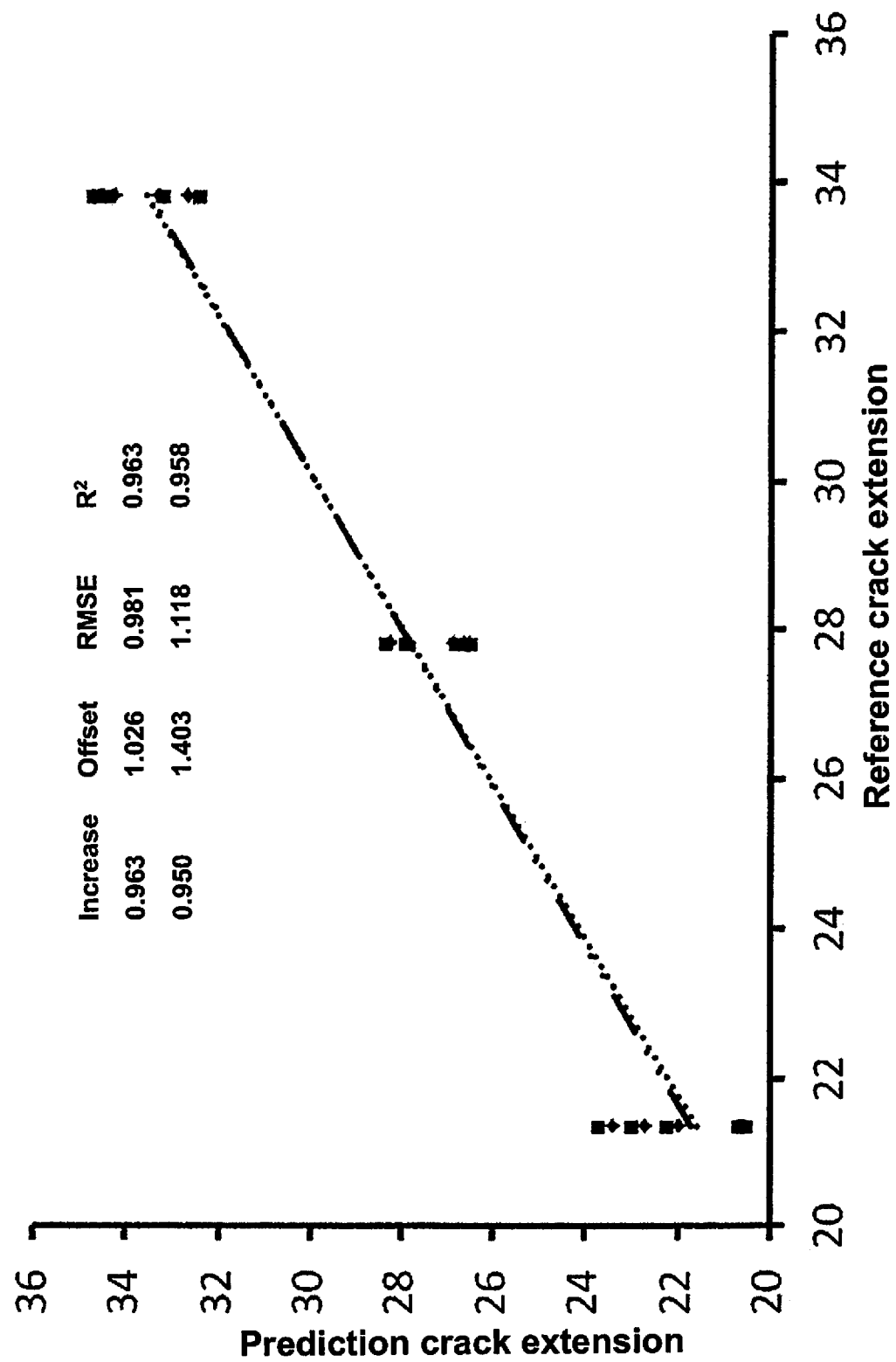

FIG. 2 a prepared regression model for predicting the crack extension in the wedge test of DIN 65448; by which the achievable adhesive strength can be calculated from the crack extension.

Figure 3:
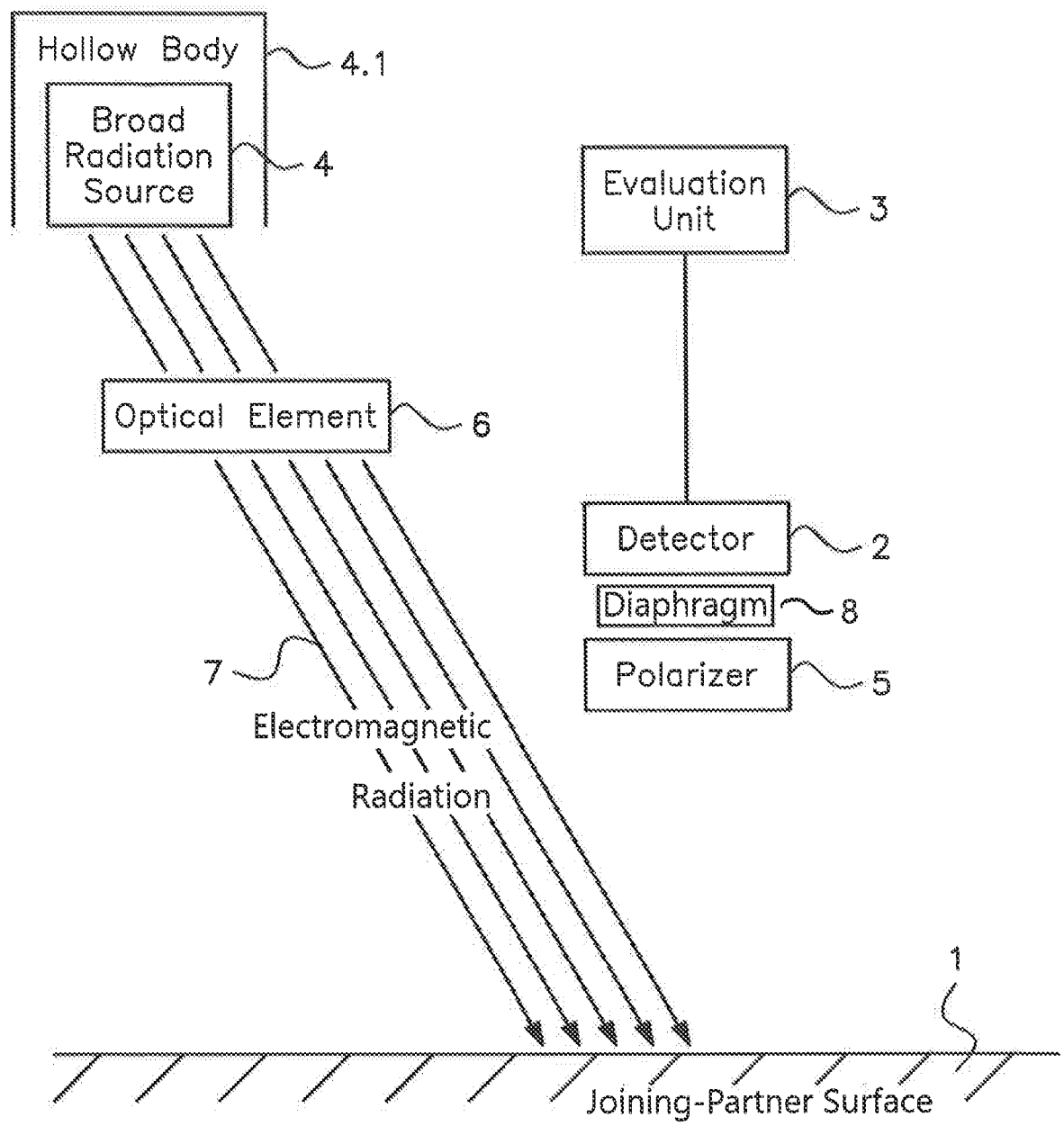

FIG. 3 a schematic representation of an arrangement according to the invention. A broadband radiation source (4) arranged inside a hollow body (4.1) emits electromagnetic radiation (7) directed as a beam by an optical element (6) at a joining-partner surface (1). A detector (2) connected to an evaluation unit (3) is impacted by the beam of electromagnetic radiation after reflection at the joining-partner surface and alignment by a polarizer (5). A diaphragm (8) arranged in front of the detector in the path of the beam of electromagnetic radiation avoids the incidence of scattered electromagnetic radiation.

EXAMPLE 1

Sample metal sheets of a titanium alloy that were coated by a plasma process with around 100 nm silica are divided into five part areas over a selected surface of 2 mm*10 mm and are homogeneously irradiated with a halogen lamp as a light source. A total of 1000×150 optical detectors were arranged in a row and column arrangement above the sample and were combined with an optics (a microscope here) so that the total sample surface could be detected with wavelength resolution and spatial resolution over a width of 2 mm. A detection of the intensities of the light reflected by the sample with wavelength resolution was implemented for individual local points using the optical detectors. A total of 150 wavelengths in the range from 400 nm to 1000 nm were taken into account. The sample here was moved perpendicular to the row arrangement of the detectors to detect the total sample surface.

The intensities detected with wavelength resolution by the detectors for the individual local points were accordingly associated with part regions of the sample each having a size of 2 mm×2 mm and form a hypercube.

A data reduction in which the procedure as described below was followed stepwise subsequently took place for the respective part region:
1. Mean value smoothing (moving average) of the spectra
2. Principal component analysis of the hypercube of the part region. A reduction of the dimensionality of the measured data set is thereby achieved without important information being lost. 2 principal components were selected for this purpose so that 2 score images are obtained.

A discrete wavelet transformation in which the procedure as described below was followed in steps subsequently took place for the respective part region:

3. The carrying out of the wavelet transformation took place in three directions (horizontal, vertical, diagonal) and in three respective stages (fine structure, medium structure, rough structure) per score image using the "Sym2" wavelet for all the transformations=9 transformations per score image.
4. Calculation of parameters of the wavelet transformations
   a. Energy (sum of squares of the coefficients of the wavelet matrix)

$$\text{Energy} = \sqrt{\Sigma_{ij} p(i,j)^2}$$

where p(i,j), coefficient of the wavelet matrix at the position (i,j).
   b. (Shannon) entropy $$\text{Entropy} = -\Sigma h * \log_2(h)$$

where h, values of the histogram classes
   c. Gray scale matrix
      i. Energy (measure for the conformity)

$$\sum_{i,j} p(i,j)^2$$

ii. Contrast (measure for the variance)

$$\sum_{i,j} |i-j|^2 p(i,j)$$

iii. Correlation (dependence of the picture elements)

$$\sum_{i,j} \frac{(i-\mu i)(j-\mu j) p(i,j)}{\sigma_i \sigma_j}$$

iv. Homogeneity (measure for monotony)

$$\sum_{i,j} \frac{p(i,j)}{1+|i-j|}$$

where p(i,j), coefficient of the wavelet matrix at the position (i,j); μ expected value; and σ standard deviation.

A determination of the achievable adhesive strength of the examined sample subsequently took place using the regression model prepared in advance using data sets of part surfaces of known adhesive strength and using a data treatment analog to the form described in steps 1-4 and stored in the electronic memory of the electronic evaluation unit.

The invention claimed is:

1. An arrangement for determining the achievable adhesive strength before forming a connection having material continuity to a surface of a joining partner, in which
   a plurality of detectors configured for a spatially resolved spectral measurement of electromagnetic radiation signals within a wavelength interval are arranged in a row and column arrangement formed by optical elements and evaluation electronics using an HSI camera; and
   the detectors are connected to an electronic evaluation unit and are arranged such that electromagnetic radiation emitted by a broadband radiation source impacts the detectors either after a reflection at the surface of one of the joining partners, a layer formed on the surface of a joining partner with which the connection having material continuity is formed and/or after the irradiation of joining partners transparent for the electromagnetic radiation, wherein
   the radiation source emits the electromagnetic radiation at an intensity that is homogeneous laterally and in time on a surface from which the electromagnetic radiation is reflected or which is transmitted by the surface, where
   at least the joining partner or a coating that is formed on the surface and on whose surface the electromagnetic radiation is directed is formed from a material that transmits and/or reflects at least 2% transmission and/or reflection of the electromagnetic radiation; and
   the electronic evaluation unit is configured to associate the measured signals of the detectors with individual local points arranged on a predefinable surface of the joining partners and in so doing associating measured signals detected at a plurality of positions with a respective part region of the detected surface and forming a three-dimensional data structure comprising one dimension with wavelength resolution and two dimensions with spatial resolution;
   the electronic evaluation unit is configured to carry out a data reduction by at least one of feature extraction using principal component analysis and feature extraction of texture information in which significant features are selected for all measurement signals of the part regions of the detected surface detected with wavelength resolution; and
   a prediction of adhesive strength achieved by the electronic evaluation unit subjecting the selected features to a regression using a regression model determined in advance, stored in an electronic memory, and prepared using feature sets obtained in an analog manner of jointing partners adhesively connected to one another with material continuity and adhesive strengths of the adhesive connections were determined.

2. An arrangement in accordance with claim 1, characterized in that the respective part region has a size in the range of 500 μm * 500 μm up to 2 mm * 2 mm.

3. An arrangement in accordance with claim 1, characterized in that the irradiation of the surface takes place with at least one angle in the range 0° to <90° with respect to the normal of the surface of the irradiated joining partner.

4. An arrangement in accordance with claim 1, characterized in that the detection and evaluation can be carried out using at least one polarizer having at least one defined known polarization plane with respect to the plane of incidence.

5. An arrangement in accordance with claim 1, characterized in that the detectors and the joining partners connected with material continuity are movable along at least one axis relative to one another.

6. An arrangement in accordance with claim 1, characterized in that (i) the radiation source has optical elements forming the electromagnetic radiation or the radiation source emits electromagnetic radiation diffusely over the surface, (ii) the radiation source is arranged within a hollow body, and (iii) a diaphragm that avoids the incidence of scattered electromagnetic radiation is arranged in front of the detectors in the optical path of the electromagnetic radiation.

7. An arrangement in accordance with claim 1, characterized in that the joining partners to be connected with material continuity form a multilayer structure.

8. An arrangement in accordance with claim 2, characterized in that the size is in the range of 500 μm * 500 μm up to 1500 * 1500 μm.

9. An arrangement in accordance with claim 1, characterized in that the detectors and the joining partners connected with material continuity are movable along at least one axis relative to one another and with the detectors at a constant spacing from one another.

10. An arrangement in accordance with claim 7, characterized in that the multilayer structure has layers formed from different materials or substances.

\* \* \* \* \*